United States Patent [19]

Yoshizaki

[11] Patent Number: 5,046,234
[45] Date of Patent: Sep. 10, 1991

[54] METHOD OF MANUFACTURING A CORE UNIT FOR A LINEAR PROBE MOTOR

[75] Inventor: Tsukasa Yoshizaki, Mie, Japan

[73] Assignee: Shinko Electric Co., Ltd., Tokyo, Japan

[21] Appl. No.: 570,959

[22] Filed: Aug. 21, 1990

Related U.S. Application Data

[60] Division of Ser. No. 339,911, Apr. 14, 1989, abandoned, which is a continuation of Ser. No. 11,861, Feb. 4, 1987, abandoned.

[30] Foreign Application Priority Data

Feb. 8, 1986 [JP] Japan .................................. 61-26348

[51] Int. Cl.$^5$ .................................................. H02K 15/02
[52] U.S. Cl. ........................................ 29/596; 310/12; 310/156
[58] Field of Search ................................ 29/596, 598; 310/12–14, 156

[56] References Cited

U.S. PATENT DOCUMENTS

| 1,275,780 | 8/1918 | Spurr | 310/34 |
| 3,694,679 | 9/1972 | Erdoesy | 310/24 |
| 4,510,420 | 4/1985 | Sasso | 310/24 |

FOREIGN PATENT DOCUMENTS

| 156150 | 9/1984 | Japan | 310/12 |
| 0118051 | 6/1985 | Japan | 310/12 |
| 0249862 | 12/1985 | Japan | 310/12 |

Primary Examiner—Carl E. Hall
Attorney, Agent, or Firm—Wenderoth, Lind & Ponack

[57] ABSTRACT

A core unit in a linear pulse motor comprising first and second cores, a plurality of magnetic poles formed on the central portion of the first and second cores, a plurality of leg parts formed on both ends thereof, each having concave grooves, first and second supporting shafts fixed to bottom surfaces of the grooves, and first and second rotating rollers supported by the first and second supporting shafts to unite the first and second core integrally. In a method of manufacturing a core unit in a linear pulse motor, the core unit being composed of integrally united first and second cores each including a plurality of magnetic poles formed on the central portion thereof, and leg parts formed on both ends thereof, each having concave grooves, the method comprises the steps of disposing first and second supporting shafts in parallel to each other for supporting rotating rollers, fitting the first and second supporting shafts in the concave grooves, disposing the first and second cores in parallel to each other spaced away in a prescribed interval, and bonding the first and second supporting shafts to the bottom surfaces of the concave grooves for fixing them.

2 Claims, 2 Drawing Sheets

METHOD OF MANUFACTURING A CORE UNIT FOR A LINEAR PROBE MOTOR

This application is a division of now abandoned application Ser. No. 07/339,911 filed on Apr. 4, 1989 which is in turn a continuation of now abandoned application Ser. No. 07/011,861, filed Feb. 4, 1987.

BACKGROUND OF THE INVENTION

1. Field of the Invention

The present invention relates to a linear pulse motor, and more particularly to a core unit in a linear pulse motor and a method of manufacturing a core unit constituting a slider (primary side magnetic flux generator unit).

2. Description of the Prior Art

As is well known, a linear pulse motor forces a slider or a secondary side scale to linearly move stepwise in response to a pulse signal supplied to a slider coil.

FIGS. 3 and 4 are respectively a front view illustrating exemplary arrangement of a linear motor, and a side view illustrating the same. In the same figures, designated at 1 is a scale formed by a continuous plate, and 2 is a slider placed on the scale 1. The slider 2 consists of a core unit 3, coils 4, 4 . . . , each wound around the magnetic poles of the core unit 3, supporting shafts 5, 6 mounted on both end parts of the core unit 3, rotating rollers 7, 7 . . . , each mounted on both ends of these supporting shafts 5, 6, permanent magnets 8a, 8b mounted on the core unit 3, and a back plate 10 mounted on these permanent magnets 8a, 8b. In addition, the core unit 3 consists, as shown in FIG. 5, of first and second cores 12, 13, and of a nonmagnetic member 14 interposed between these cores 12, 13 for magnetically shielding both the cores. Thereupon, magnetic poles 12a, 12a . . . , are formed on the central portion of the core 12, and leg parts 12c each having concave grooves 12b are formed on both ends of the core 12. The supporting shafts 5, 6 are inserted into the concave groove 12b and fixed. Moreover, the nonmagnetic member 14 comprises resin for example.

Hereupon, the core unit 3 however suffered from the following drawbacks until now, since a binder injected between the cores 12 and 13 as the nonmagnetic member 14 and solidified.

(1) The use of a binder makes the core unit costly.

(2) Vertical positions of the cores 12, 13 do not completely agree with each other whereby a slight stepped portion is produced therebetween. This stepped portion is likely to produce any looseness when the supporting shafts 5, 6 are inserted into the concave groove 12b and fixed, and thus it is needed to remove the stepped portion between the bottom surfaces 12d, 13d of the respective concave grooves 12b, 13b formed in the cores 12, 13 by adequately processing these bottom surfaces 12d, 13d.

(3) The above stepped portion also produces another stepped portion between the magnetic pole surface of the core 12 (surface opposing to the scale 1) and that of the core 13. Accordingly, processing to remove this stepped portion is also necessary.

(4) The core unit 3 is likely to be warped upon the solidification of the binder.

SUMMARY OF THE INVENTION

In view of the drawbacks of the prior techniques, it is an object of the present invention to provide core unit in a linear motor and a method of manufacturing a core unit in a linear pulse motor, said core unit being not in need of the use of a binder, with the results that it can be manufactured inexpensively and that no displacement is caused between the vertical positions of the first and second cores.

To achieve the above object, there is provided a core unit in a linear motor comprising first and second cores, a plurality of magnetic poles formed on the central portion of said first and second cores, a plurality of leg parts formed on both ends thereof, each having concave grooves, first and second supporting shafts fixed to bottom surfaces of said grooves to unite said first and second cores integrally, and first and second rotating rollers supported by said first and second supporting shafts. There is also provided a method of manufacturing a core unit, the core unit being constructed by integrally uniting first and second cores including a plurality of magnetic poles each formed on the central portion thereof and leg parts each having concave grooves formed on both ends thereof, the method comprising the steps of disposing first and second supporting shafts in parallel with each other for supporting rollers, fitting the first and second supporting shaft in the concave grooves, disposing the first and second cores in parallel to each other spaced away in a prescribed interval, and bonding the first and second supporting shaft to bottom surfaces of the respective concave grooves for fixing them.

According to the core unit in a linear pulse motor and the method of manufacturing thereof of the present invention, the first and second supporting shafts are bonded to the first and second cores and fixed to each other. Namely, vertical positions of both the cores are determined with respect to the supporting shafts, whereby a stepped portion between both the cores is prevented from being produced.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
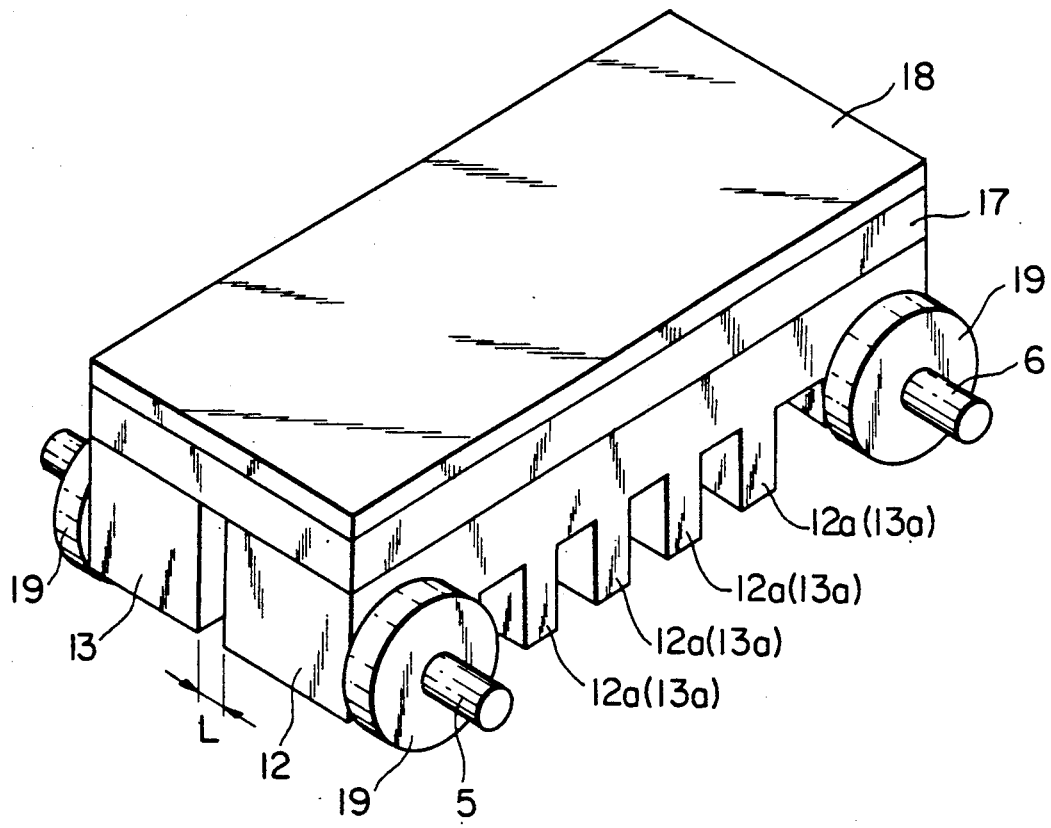
FIGS. 1 and 2 are respectively a perspective and a front view both illustrating arrangement of an embodiment of a core unit in a linear pulse motor and a method for manufacturing a core unit in a linear pulse motor according to the present invention.
Figure 2:
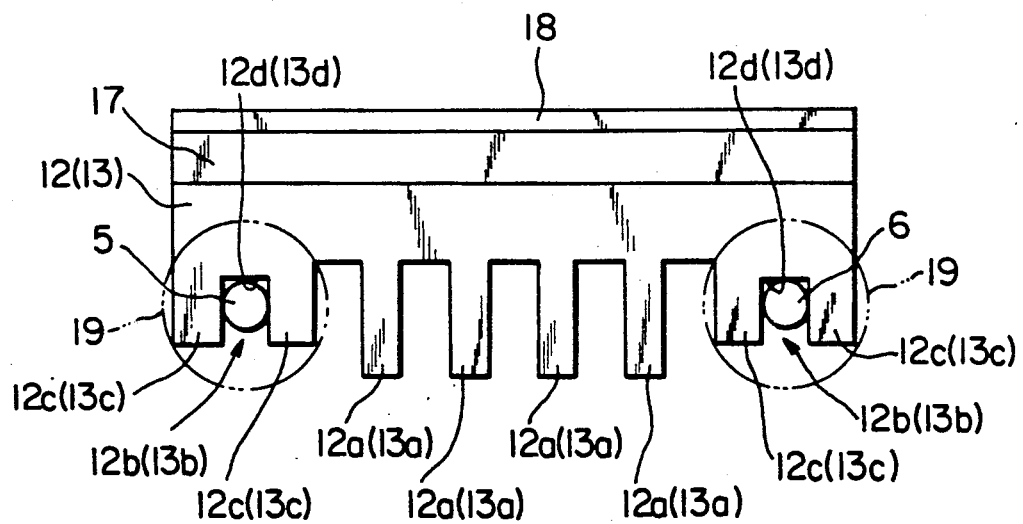
Figure 3:
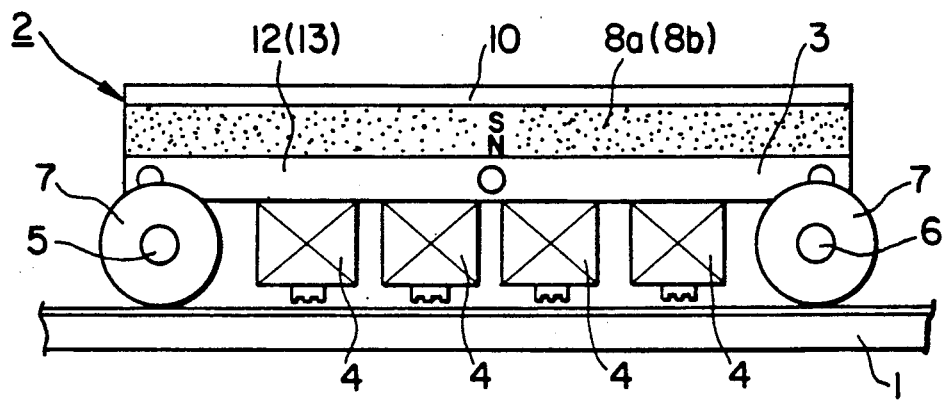
FIGS. 3 and 4 are respectively a front view and a side view both illustrating exemplary arrangement of a conventional linear pulse motor.
Figure 4:
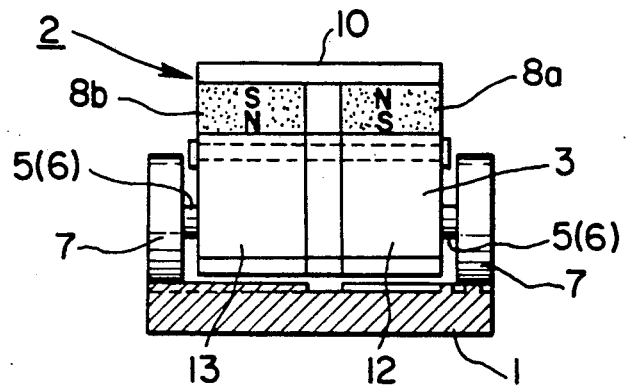
Figure 5:
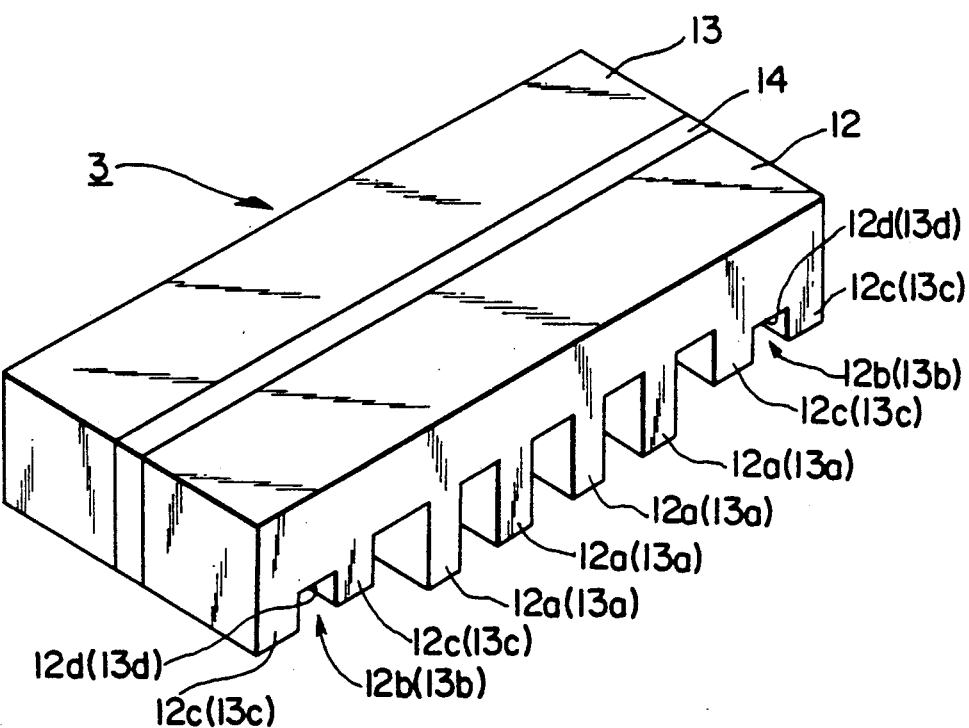
FIG. 5 is a perspective view illustrating arrangement of a core unit in the linear pulse motor of FIGS. 3 and 4.

In succession, an embodiment of a core unit in a linear pulse motor and a method of manufacturing thereof according to the present invention will be described with reference to FIGS. 1 and 2. In the figures, the same symbols as those in FIGS. 3, 4 and 5 shall be applied.

A core unit of the present invention comprises first and second cores, a plurality of magnetic poles formed on the central portion of the first and second cores, a plurality of leg parts formed on both ends thereof, each having concave grooves, first and second supporting shafts fixed to bottom surfaces of said grooves to unite the first and second cores integrally, and first and second rotating rollers supported by the first and second supporting shafts.

The manufacturing method of the present invention first disposes supporting shafts 5, 6 in parallel to each other spaced away parallely in a prescribed interval. The prescribed interval denotes a distance between respective concave grooves 12b, 13b formed in both leg parts 12c, 13c of a core 12. In succession, the concave grooves 12b, 13b of the cores 12, 13 and supporting shafts 5, 6 are respectively fitted in the concave grooves 12b, 13b with an interval between the cores 12, 13 made a prescribed distance L, and the supporting shafts 5, 6 are bonded to respective bottom surfaces 12d, 13d of the concave grooves 12b by means of an ultraviolet-curing agent. The core unit according to the present embodiment is manufactured as described above. Moreover, in FIGS. 1 and 2, designated at 17 is a permanent magnet, 18 is a back plate, and 19, 19 . . . , are rollers.

Furthermore, although in the above embodiment an ultraviolet-curing agent was employed, another types of bonding agent may be employed.

According to the present invention, as described above, first and second supporting shafts for supporting the roller are disposed in parallel to each other, and fitted to the concave grooves formed in the leg parts of the first and second cores, and these first and second cores are disposed in parallel to each other spaced away in a prescribed interval, with the supporting shafts being bonded to the bottom surfaces of the respective concave grooves. Accordingly, vertical positions of both the cores are determined with reference to the supporting shafts without a fear of producing a stepped part between both the cores. As a result, there is produced no looseness between the supporting shafts and the core unit, and furthermore it is not needed to process the bottom surfaces of the concave grooves and the magnetic pole surface.

Although a certain preferred embodiment has been shown and described, it should be understood that many changes and modifications may be made therein without departing from the scope of the appended claims.

What is claimed is:

1. A method of manufacturing a core unit in a linear pulse motor, said core unit being composed of integrally united first and second cores each including a plurality of magnetic poles formed on the central portions thereof, and leg parts formed on both ends thereof, each having concave grooves, said method comprising the steps of:

(a) disposing first and second supporting shafts in parallel to each other for supporting rotating rollers;

(b) fitting said first and second supporting shafts in said concave grooves;

(c) disposing said first and second cores in parallel to each other and spaced apart a prescribed interval with the contact grooves of each core contacting the shaft into which it is fitted thereby determining the vertical position of the cores relative to each other; and (d) bonding said first and second supporting shafts to bottom surfaces of said concave grooves as disposed in step (c), above.

2. A method of manufacturing a core unit in a linear pulse motor according to claim 1, wherein said bonding of said first and second supporting shafts to said bottom surfaces of said concave grooves is effected by an ultraviolet-curing agent.

* * * * *